US009692808B2

(12) United States Patent
Fransen et al.

(10) Patent No.: US 9,692,808 B2
(45) Date of Patent: Jun. 27, 2017

(54) CODE PATH DIRECTIVES FOR CONTROLLING IN-APP EXPERIENCES

(71) Applicant: Adobe Systems Incorporated, San Jose, CA (US)

(72) Inventors: Peter R. Fransen, Lehi, UT (US); Andy H. VanWagoner, Lehi, UT (US)

(73) Assignee: Adobe Systems Incorporated, San Jose, CA (US)

( * ) Notice: Subject to any disclaimer, the term of this patent is extended or adjusted under 35 U.S.C. 154(b) by 80 days.

(21) Appl. No.: 14/163,502

(22) Filed: Jan. 24, 2014

(65) Prior Publication Data
US 2015/0212814 A1    Jul. 30, 2015

(51) Int. Cl.
G06F 9/445    (2006.01)
H04L 29/08    (2006.01)
G06F 11/34    (2006.01)

(52) U.S. Cl.
CPC .......... *H04L 67/10* (2013.01); *G06F 9/44505* (2013.01); *G06F 11/34* (2013.01); *H04L 67/22* (2013.01); *G06F 9/44521* (2013.01)

(58) Field of Classification Search
None
See application file for complete search history.

(56) References Cited

U.S. PATENT DOCUMENTS

| 8,321,858 B1* | 11/2012 | Marmaros | G06F 8/65 717/173 |
| 8,595,186 B1* | 11/2013 | Mandyam | G06F 8/38 707/632 |
| 2004/0187095 A1* | 9/2004 | Gilfix | H04L 67/303 717/120 |
| 2005/0132382 A1* | 6/2005 | McGuire | G06F 8/68 719/311 |
| 2005/0262503 A1* | 11/2005 | Kane | 717/176 |
| 2009/0313004 A1* | 12/2009 | Levi | G06F 8/30 703/28 |

(Continued)

OTHER PUBLICATIONS

"How to Play Minesweeper", anonymous author, Jan. 7, 2014.*
"Play minesweeper online", anonymous author, publication date Jul. 6, 2012.*

Primary Examiner — Daxin Wu
(74) Attorney, Agent, or Firm — Wolfe-SBMC

(57) ABSTRACT

Code path directives for controlling in-app experiences are described herein that may be used to direct client applications regarding usage of multiple alternative code paths incorporated with the client applications. The code paths are implemented as part of compiled code for the applications and the code path directives enable delivery of different experiences to clients without changing the compiled code or re-deploying the application through an application store, or otherwise. In various implementations, analytics data that describes contextual characteristics for usage of a client application having alternative code paths is obtained by a service. The service selects one of the code paths based on processing of the collected analytics data and configures a corresponding code path directive to contain an indication of the selected code paths. Then, communication of the code path directive to the client device causes the client application to execute using the selected code path.

20 Claims, 6 Drawing Sheets

(56) References Cited

U.S. PATENT DOCUMENTS

| | | | | |
|---|---|---|---|---|
| 2010/0233996 A1* | 9/2010 | Herz | ............... | H04L 63/08 455/411 |
| 2010/0299663 A1* | 11/2010 | Weissman | ............... | G06F 8/71 717/170 |
| 2011/0258595 A1* | 10/2011 | Clevenger | ............... | G06F 8/40 717/106 |
| 2013/0111460 A1* | 5/2013 | Mohamed | ............... | G06F 9/448 717/172 |
| 2013/0121580 A1* | 5/2013 | Chen | ............... | G06Q 10/063 382/182 |
| 2013/0157637 A1* | 6/2013 | Bos | ............... | H04W 4/001 455/418 |
| 2013/0346229 A1* | 12/2013 | Martin et al. | ............... | 705/26.3 |
| 2013/0346958 A1* | 12/2013 | Cohen | ............... | G06F 8/65 717/170 |

* cited by examiner

CODE PATH DIRECTIVES FOR CONTROLLING IN-APP EXPERIENCES

BACKGROUND

The amount of application content consumed by users of various computing devices including tablet devices, laptops, mobile phones, desktop computers, and so forth, is ever-increasing. To assist users in obtaining application content, a service provider may provide an application store service through which users may access, browse, select, purchase, and/or download applications for their devices. To ensure the integrity of the store and quality of applications provided, the service provider may subject applications submitted by developers for distribution via the store to an approval process before releasing the applications to the store. In a traditional model, developers must submit each new version or update of an application for approval before new features are made available to end-users. Thus, the process of making changes to in-app content and experiences may involve updating of source code, releasing the code to the application store, and waiting some time before the new code is approved and made available. Accordingly, developers may be forced to undertake costly and time consuming re-development each time their applications are changed.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Code path directives for controlling in-app experiences are described herein. The code path directives may be configured by a service to direct client applications regarding usage of multiple alternative code paths incorporated with the client applications. The code paths are implemented as part of compiled code for the applications and the code path directives enable delivery of different experiences to clients without having to modify the compiled code or re-deploy updated versions of the application to clients through an application store or otherwise.

In one or more implementations, analytics data that describes contextual characteristics for usage of a client application having multiple alternative code paths is obtained by the service from a client device. The alternative code paths may each correspond to a different experiences and/or content that may by targeted and delivered to clients based on the contextual characteristics indicated by the analytics data. The service may operate to select one of the multiple alternative code paths based on processing of the collected analytics data and configure a corresponding code path directive to supply the client application with an indication of the selected code paths. Then, communication of the code path directive to the client device causes the client application to execute using the selected one of the multiple alternative code paths.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
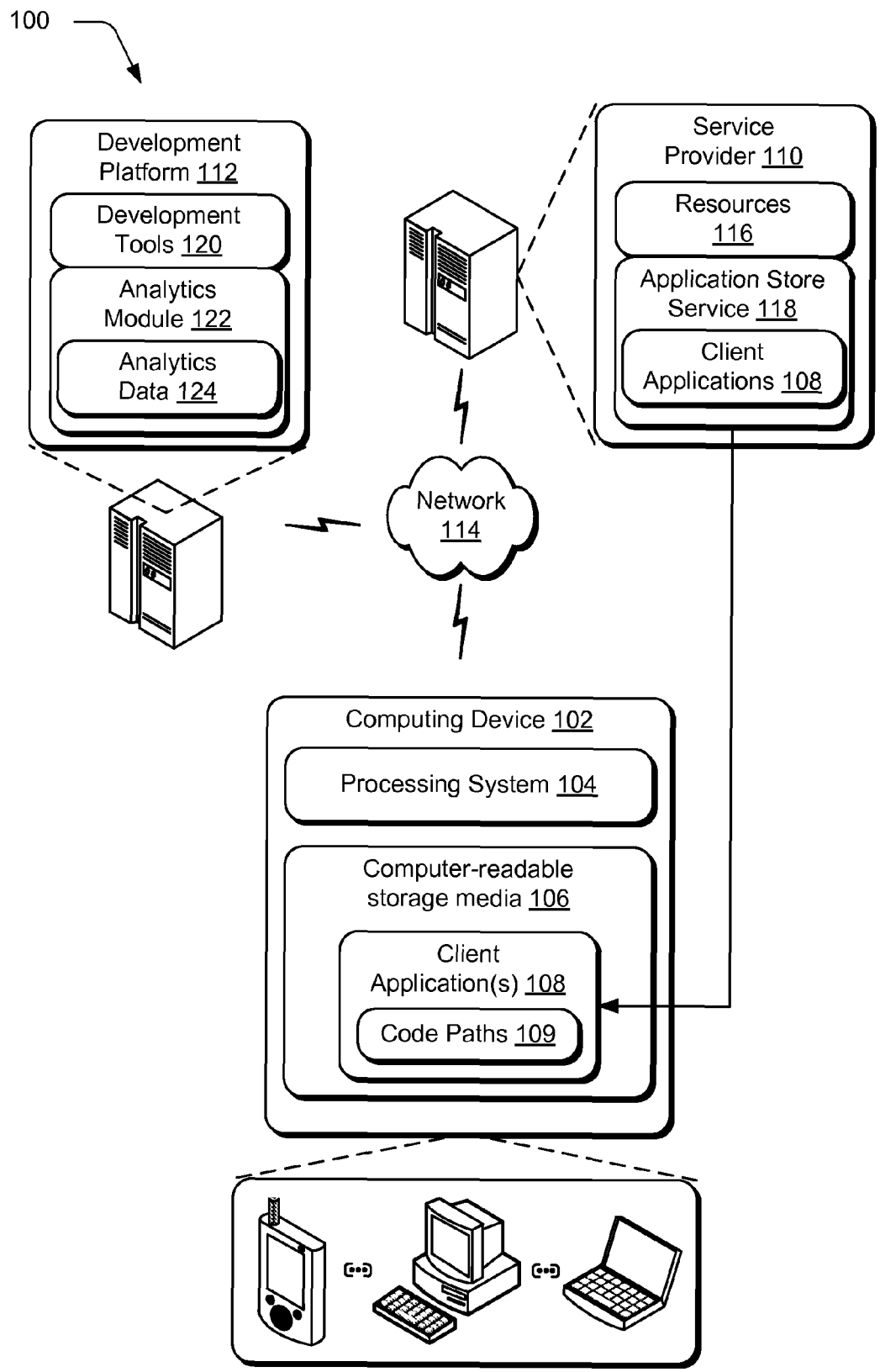
FIG. 1 is an illustration of an environment in an example implementation that is operable to employ techniques described herein.

Application developers that make use of an online application store to distribute their applications generally have to submit each new version or update of an application for approval before new features are made available to end-users. Thus, making changes to in-app experiences and content may involve updating of source code, releasing the code to the application store, and waiting for approval of the new code, which is time consuming and may be costly for the developer.

Code path directives for controlling in-app experiences are described herein. The code path directives may be configured by a web-based service to direct client applications regarding usage of multiple alternative code paths incorporated with the client applications. The different code paths are implemented as part of compiled code for the applications and the code path directives enable delivery of different, custom experiences to clients without having to modify the compiled code or re-deploy updated versions of the application to clients through an application store or otherwise.

The code path directives may be implemented in any suitable way to convey information regarding selected code paths and/or associated instructions, code, and/or data to direct applications. For example, the code path directives generated by a service may be configured as messages or notifications that conform to a selected messaging protocol that supports communications between web-based services and client applications. Some examples of suitable protocols include but are not limited to Simple Object Access Protocol (SOAP) or other XML based message format; Java Message Service (JMS) or other script-based message format; or a proprietary, application-specific messaging protocol, to name a few illustrative examples. Generally speaking, code path directives include at least indications of selected code paths, such as alphanumeric codes, path names, links, file names, object names, or other metadata or identifiers that correspond to different code paths. Code path directives may optionally include accompanying dynamic code, such as a dynamic link library (DLL), a resource file, a script-based extension, an applet or application plugin-module, or other dynamic code that may be called, referenced, invoked or otherwise utilized by compiled code of an application to provide added or enhanced features.

Thus, code path directives may be used to selectively target experiences and content to different clients or groups of client by specifying code paths to be used by the client applications in different scenarios. For example, different custom user interfaces, links to data, data formats, and other aspects may be provided to two different business customers or to users that are located in different geographic locations by communicating different code path directives to different groups. Since the different code paths are already included as existing compiled code of the client applications, targeted experiences may be delivered without redevelopment, redeployment and approval of applications through an application store, modification of the compiled code, and/or updating to new versions of the applications by individual clients.

In one or more implementations, analytics data that describes contextual usage characteristics for usage of a client application having multiple alternative code paths may be collected by the web-service from client devices. The usage characteristics may correspond to a selected geographic location, user behavior, type of device, industry, marketing segment, or other sub-group of clients that use the application. The alternative code paths may each correspond to different experiences and/or content that may by targeted and delivered to clients based on usage characteristics indicated by the analytics data. By way of example, the different experiences and/or content may include different user interface elements, links, products, applets, data sets, images, graphic elements, menus, media selections, and/or other application functionality or features that are targeted to a combination of one or more of the usage characteristics.

The web-based service operates to select one of the multiple alternative code paths based on processing of collected analytics data and configure a corresponding code path directive to supply the client application with an indication of the selected code paths. In an implementation, a code path directive may be configured as a character string including an object or other suitable indication of a corresponding code path that causes an application to employ the indicated code path. Then, communication of the code path directive to the client device causes the client application to execute using the selected one of the multiple alternative code paths.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and one or more client application(s) 108 embodied on the computer-readable storage media 106 and operable via the processing system 104 to implement corresponding functionality described herein.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 6.

In at least some embodiments, the client application(s) 108 may include a browser of the computing device operable to access various kinds of web-based resources (e.g., content and services). Additionally, the client application(s) 108 may include a web-application that is operable via a browser using a corresponding runtime environment. Further, one or more client application(s) 108 may be configured as a client-side component having integrated functionality operable to access web-based resources (e.g., a network-enabled application), browse the Internet, interact with online providers, and so forth. Further, a client application 108 may be configured as a standalone desktop application that is deployed to a computing device. In each of these examples, client applications(s) may be accessed and downloaded over a network from an application store service as described in greater detail below.

In accordance with techniques described herein, client applications 108 may be configured to include code paths 109 as part of native and/or compiled code of the applications. The code paths 109 represent multiple alternative execution pathways that may be provided in conjunction with at least some functionality provided by the client applications and selectively invoked to change the behavior of the applications. Naturally, each individual application may be configured to include one or multiple collections of alternative execution pathways (e.g., code path groupings) corresponding to different functional aspects of the application. The alternative execution pathways represented by the code paths 109 may correspond to different experiences and/or content that may be selectively targeted to different client devices/end-users based on analytics data associated with the client devices/end-users, further details of which are described below.

The environment 100 further depicts one or more service providers 110, and a development platform 112 that may be configured to communicate with computing device 102 over a network 114, such as the Internet, in a "cloud-based" computing environment. Generally, speaking a service provider 110 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth.

Content may include various combinations of text, video, ads, audio, multi-media streams, animations, images, web documents, web pages, applications, device applications, and the like.

An application store service 118 is a one particular kind of resource 116 that may be accessible via a service provider 110. The application store service 118 represents functionality through which client applications 108 may be deployed to computing devices 102. For instance, the application store service 118 provides a platform that enables user access to an online application database (e.g., an application marketplace) to browse, select, purchase, and/or download applications. A diversity of applications from a various developers may be made available to clients through application store service 118. As mentioned, the application store service 118 may subject application to an approval process before the applications are released to the store for access by clients.

The development platform 112 is representative of functionality operable to support techniques for creation, deployment, analysis and management of client applications by developers. The development platform 112 may be configured as a standalone web-service (as shown) that is implemented by one or more servers. In addition or alternatively, the development platform 112 may represent a particular resource 116 that is provided by the service provider 110 in the form of a web-service. As depicted in FIG. 1, the development platform 112 may include a variety of development tools 120 to facilitate interactions to develop applications, including but not limited to source code production, project management, compiling of code, and distributing code via an application store service or otherwise.

The development platform 112 may also include or make use of an analytics module 122 that is representative of functionality to obtain and/or analyze analytics data 124 in various ways. The analytics module 122 may be implemented as a software module, as a hardware logic device, as a combination of hardware and software, and so forth. The analytics module 122 may communicate with client devices and application over a network to collect analytics data 124. The analytics module 122 is operable to make code path selections for clients based on processing of analytics data 124 that is collected. The selection of code paths by the analytics module may involve matching of individual clients/end-users and/or groups/segments to targeted experiences and content that are implemented via different code paths 109. Based on the matching, the analytics module 122 may also generate and communicate code path directives to the clients to invoke code paths 109 to deliver the targeted experiences and content. This process may occur without a developer having to modify compiled code, deploy new executable files, or gain approval for a different version of an application via the application store service 118.

For instance, the analytics data 124, may describe client and/or user interactions with the service provider 110 and/or resources 116 available from the service provider 110, including interactions with the application store service 118. The analytics data 124 may also be indicative of a usage context associated with various applications 108 that may be leveraged to provide targeted experiences. For example, the analytics module 122 may process analytics data 124 to characterize clients/end-users and/or form groups or segments clients/end-users having common usage characteristics. The usage context may reflect various contextual usage characteristics such as a particular location, a user behavior, an application state, user history data, a device type, user characteristics and/or demographics, and/or lifecycle data captured for a business or organizational process, to name a few examples Different application experiences may be targeted to combinations of one or more usage characteristics indicative of a usage context, including but not limited to the example usage characteristics enumerated.

Figure 2:
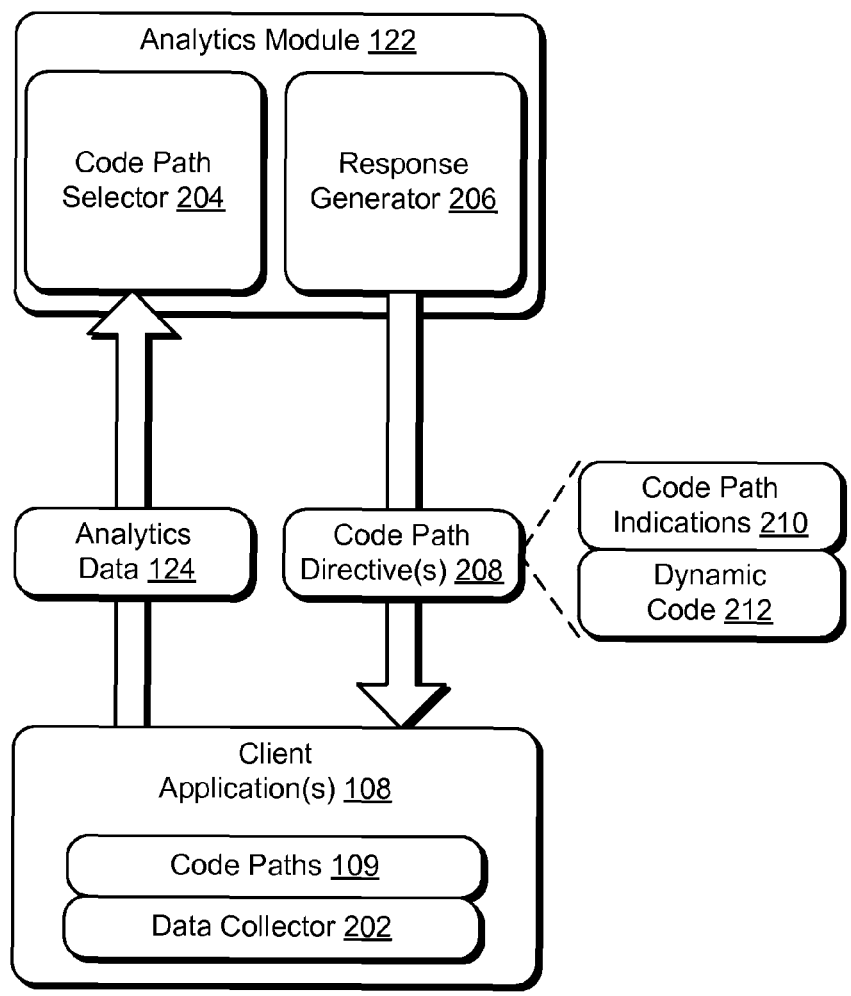
FIG. 2 illustrates an example annotation scenario in accordance with one or more implementations.

To further illustrate these and other aspects, consider an example operational scenario that is depicted in FIG. 2, generally at 200. In particular, FIG. 2 represents interaction that may occur between example implementations of a client application 108 and an analytics module 122. In the depicted example, the client application 108 may include or make use of a data collector 202 in addition to having multiple code paths 109 as introduced in relation to FIG. 1. The data collector 202 represents functionality operable to collect analytics data 124 associated with operation of the client application. The data collector 202 may be further configured to communicate with the analytics module 122 to supply the collected data for processing by the analytics module 122.

As further represented in FIG. 2, the analytics module 122 may include or make use of a code path selector 204 and a response generator 206. The code path selector 204 represents functionality operable to process analytics data 124, which may involve characterizing clients/end-users and matching the clients/end-users to targeted experiences as noted above. The code path selector 204 may also operate to make the selections of code paths 109 to be used by clients/end-users based on the characterizing and matching. The response generator 206 represents functionality operable to form responses for communication to clients that include indications regarding selected code paths 109. Any suitable response format and/or communication techniques may be employed. In general, the response is formatted to cause applications to execute using the code paths 109 that are selected by the code path selector 204.

As represented in FIG. 2, responses that are produced by the response generator 206 may be in the form of code path directives 208 in one or more implementations. The code path directives 208 may be implemented in any suitable way to convey information regarding selected code paths 109 and associated instructions, code, and/or data to direct applications. For example, the code path directives 208 may be messages/notifications that are configured according to a selected messaging protocol that supports communications between web-based services and client applications, examples of which include but are not limited to Simple Object Access Protocol (SOAP) or other XML based message format; Java Message Service (JMS) or other script-based message format; or a proprietary, application-specific messaging protocol, to name a few illustrative examples. Generally speaking, code path directives 208 include at least code path indications 210 and may additionally include dynamic code 212 as shown in FIG. 2.

The code path indications 210 represent data sufficient to convey selections of code paths 109 made via the code path selector 204 to client applications. In one or more implementations, code path indications 210 may be formatted as character strings. Each such character string may include one or more script-based objects configured to trigger use of a selected code path by the client application. By way of example and not limitation, code path indications 210 in the form of character strings may be configured as a JavaScript Object Notation (JSON) strings. In another example, metadata and/or header fields associated with the code path directives 208 (e.g., message headers/metadata) may be configured to include code path indications 210, such as alphanumeric codes, path names, links, file names, object names, or other metadata or identifiers that applications may employ to recognize and distinguish between different code paths.

Dynamic code 212 represents dynamic code components that may be used by the client application in connection with the selected one of the multiple alternative code paths indicated by the code path directive 208. Generally, dynamic code 212 may be used to supplement or enhance built-in functionality of the application that is provided in compiled code. For example, the dynamic code 212 may include one or more of a dynamic link library (DLL), a resource file, a script-based extension, an applet or application plugin-module, or other dynamic code that may be called, referenced, invoked or otherwise utilized by compiled code of an application. The dynamic code 212 enables various aspects of the application experience to be changed dynamically without having to change to underlying compiled code. For example, the dynamic code 212 may define customizations for a user interface of the client application. Other visual aspects, such as logos, font selections, colors, and layout of content may also be defined. Dynamic code 212 may also be employed to add some new features, such as by changing links to embedded content items (images, audio, video, text), implementing pluggable updates, invoking supported resources from a service provider, and so forth. Thus, not only may code path directives 208 be employed to drive which code paths are used, dynamic code 212 may be used to change behaviors of the application with respect to a selected code paths.

Having considered an example environment, consider now a discussion of some example details of techniques for controlling in-app experiences using code path directives in accordance with one or more implementations.

Example Procedures

This section describes example procedures in accordance with one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some embodiments the procedures may be performed by a suitably configured device, such as the example computing device 102 of FIG. 1 that includes or makes use of a client application module 108. Aspects of the procedures may also be performed via a web-service that is associated with a development platform 112 and/or accessible from a service provider 110 over a network.

Figure 3:
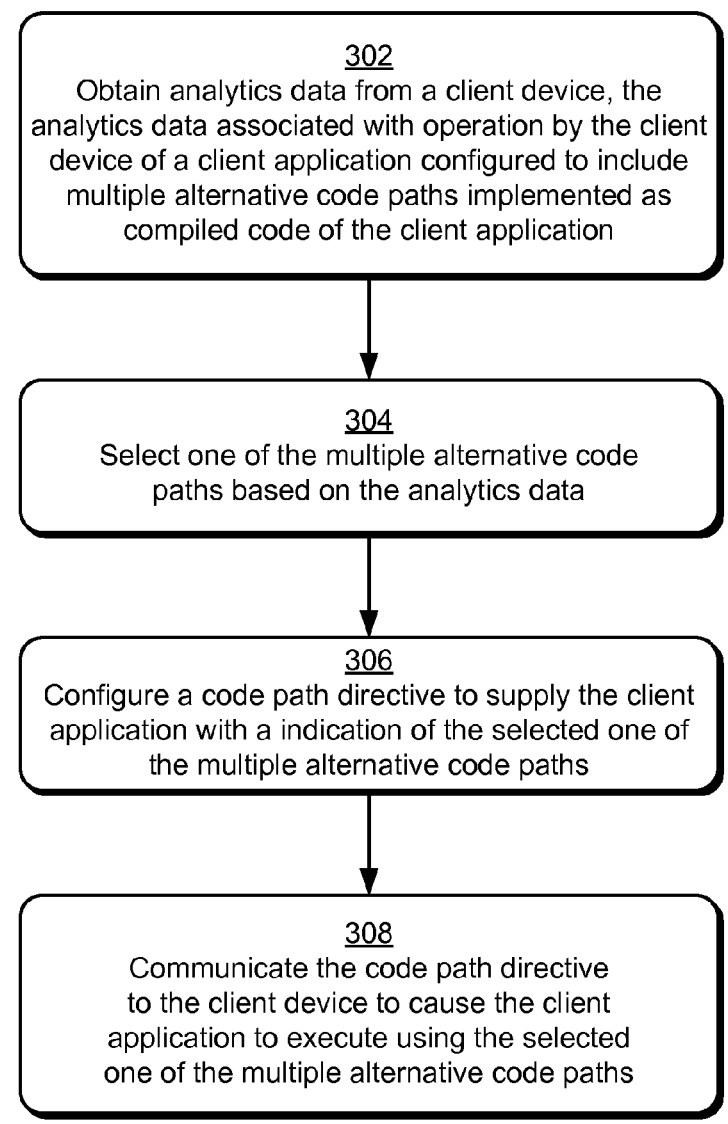
FIG. 3 is a flow diagram depicting an example procedure for configuration of a code path directive to cause operation of an application using a selected code path in accordance with one or more implementations.

FIG. 3 is a flow diagram depicting an example procedure 300 for configuration of a code path directive to cause operation of an application using a selected code path. Analytics data is obtained from a client device (block 302). The analytics data that is obtained may be associated with operation by the client device of a client application configured to include multiple alternative code paths implemented as compiled code of the client application. In one or more implementation, a client application 108 may be deployed to an application store service 118 through which client computing devices may access and download instances of the client application for use by the client devices. Moreover, a web-based service may be configured to interact with the instances of a client application 108 and/or data collector module 208 implemented by the clients to collect corresponding analytics data 124. As described previously herein, the web service may implement an analytics module 122 operable to obtain and use analytics data 124 from clients in various ways. This includes at least selection of code paths 109 to control the way in which alternate pathways integrated with compiled code for applications are used during execution of the applications. The multiple alternative code paths integrated with compiled code for applications may correspond to different experiences that may be targeted to end-users based on the analytics data, such as different user interfaces, media items, plug-in applets, and so forth.

Thus, responsive to obtaining analytics data, one of the multiple alternative code paths is selected based on the analytics data (block 304). Here, an analytics module 122 may be configured to select a code path via a code path selector 204 or otherwise. The selection may involve matching of clients/applications to particular experiences according to the collected analytics data. For instance, analytics data may include information regarding a usage context associated with operation of the client application by the client device. The usage context may reflect characteristics such as a particular location, a user behavior, an application state, user history data, a device type, user characteristics and/or demographics, and/or lifecycle data captured for business or organizational process, to name a few examples. Different experiences may be targeted to combinations of one or more characteristics indicative of a usage context, including but not limited to the example characteristics enumerated.

The analytics module is operable to process the analytics data to recognize different characteristics and characterize clients/applications accordingly. Code paths for a particular application may each be configured to implement a different experience. Thus, once a usage context is identified, characteristics that define the usage context may be used as indicators to ascertain a corresponding targeted experience that matches one or more of the characteristics. Moreover, a code path that implements the targeted experience may be determined and selected based upon the characterizing and matching of the usage context to the targeted experience.

Following selection of a code path, a code path directive is configured to supply the client application with an indication of the selected one of the multiple alternative code paths (block 306) and the code path directive is communicated to the client device to cause the client application to execute using the selected one of the multiple alternative code paths (block 308). The code path directive may be configured in various formats using different protocols as discussed above. For example, a code path directive may configured as a character string that includes the indication of the selected one of the multiple alternative code paths. Optionally, the code path directive may include one or more dynamic code components for use by the client application in connection with a selected alternative code path. Examples of various kinds of code path indications and dynamic code components that may be incorporated with a code path directive were previously discussed in relation to the example environment of FIGS. 1 and 2.

As noted, client applications that use alternative code paths may be subject to an approval process prior to the client applications being made available via an application store service. In this context, use of the code path directive enables delivery of different experiences targeted to different client devices without resubmission of the client application to the approval process. In other words, once compiled code implementing the code pathways is approved, the application may be available for download and installation by clients. The different pathways may then be selectively invoked using code path directives in the manner described herein without having to redevelop, recompile, resubmit and/or redeploy the application. The code path directives provide a mechanism to trigger and make use of existing code pathways that are already contained in compiled application code.

Figure 4:
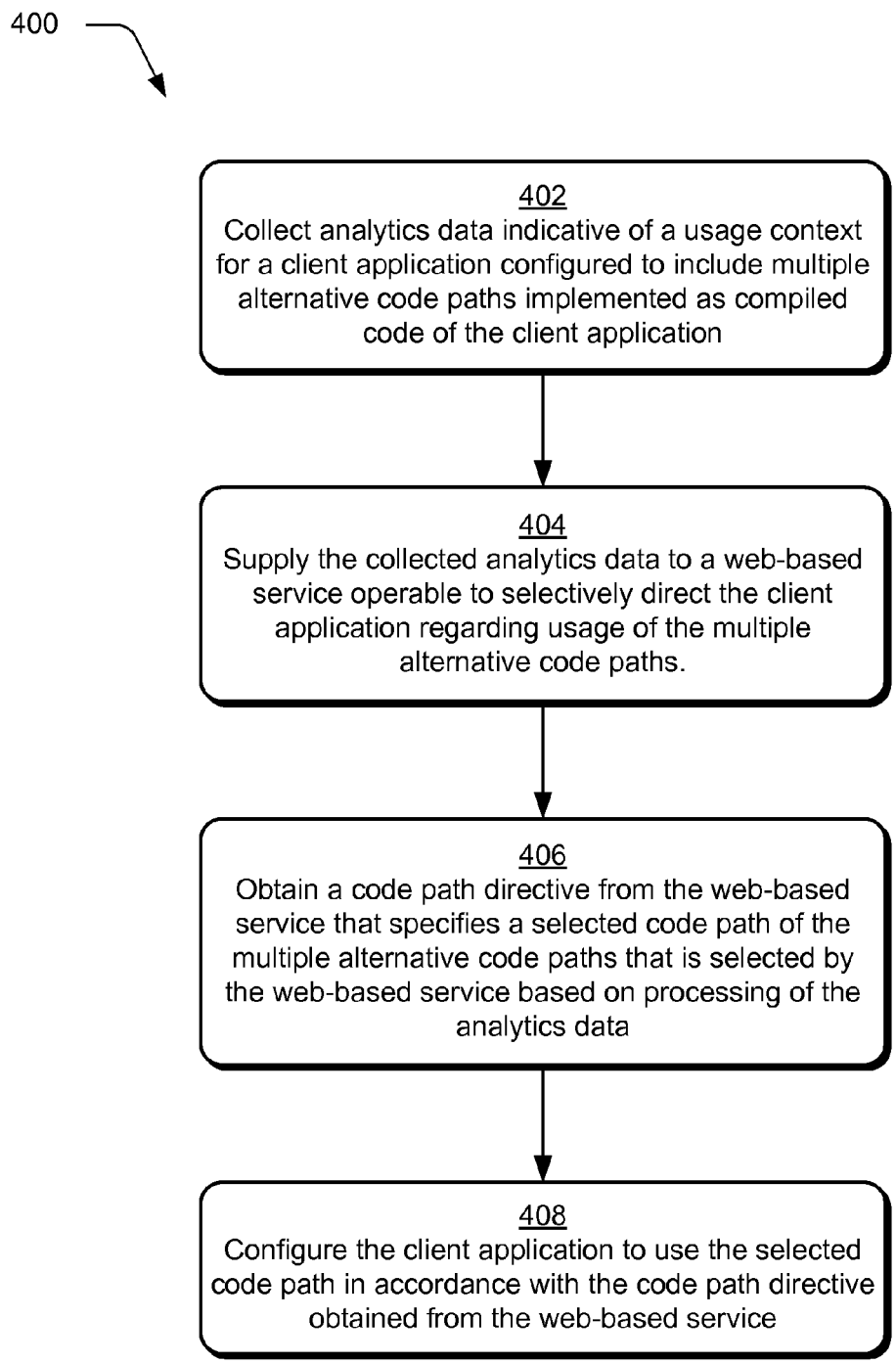
FIG. 4 is a flow diagram depicting an example procedure in which an application is directed regarding usage of alternative code paths based on communication with a web-based service in accordance with one or more implementations.

FIG. 4 is a flow diagram depicting an example procedure 400 in which an application is directed regarding usage of alternative code paths based on communication with a web-based service. Analytics data is collected that is indicative of a usage context for a client application configured to include multiple alternative code paths implemented as compiled code of the client application (block 402). Then, the collected analytics data is supplied to a web-based service operable to selectively direct the client application regarding usage of the multiple alternative code paths (404). For example, an application may include or make use of a data collector 202 that operates in the manner previously described to collect various analytics data 124. The data collector 202 may further operate to communicate the data to a web-based service for processing. The web-service may be implemented via a development platform 112, a service provider 110, or otherwise. In order to process the analytics data 124 and provide responses to clients/applications, the web-service may include or make use of an analytics module 122 as described herein. Responses that are provided by the web-based service may be configured to direct client applications regarding which code paths of multiple alternative code paths (e.g., alternative execution pathways) to use under particular circumstances. Code path directives 208 as described throughout this document represent one example type of a response that is suitable to direct applications on usage of alternative code paths.

Thus, responsive to communication of collected data to the web-service, a code path directive is obtained from the web-based service that specifies a selected code path of the multiple alternative code paths that is selected by the web-based service based on processing of the analytics data (406). For example, a client application 108 may obtain a code path directive 208 that includes one or more code path indications 210 that reflect selections of alternate pathways by the web-service. The code path directive 208 may optionally include dynamic code 212 to implement dynamic features and/or content items in connection with a selected code path. The code path directives therefore provide a mechanism to deliver indications regarding selected code paths to clients/application and/or to make some changes to the functionality and content that is associated with the selected code paths using dynamic code 212.

The client application is configured to use the selected code path in accordance with the code path directive obtained from the web-based service (block 408). Code path indications 210 contained in a code path directive may be used to trigger corresponding code paths in various ways. In at least some embodiments, the code path directive includes one or more script-based objects configured to trigger use of the selected code paths by the client application. For example, path names, codes or other identifiers provided as script-based objects may act as flags that may be referenced by compiled code for the application to choose different pathways. Each of multiple alternative code paths may correspond to different targeted experiences that may be selectively delivered to different clients.

Generally, the code path directives are designed to cause different clients to use selected code paths as indicated by code path directives sent to the client. For instance, a code path directive may be configured as a resource file that is referenced when the application executes to implement the selection of corresponding pathways. Alternatively, the code path directive may be applied to update values in an initialization file or variable fields to values that indicate the selected code paths. In this example, an updating process to set appropriate values for the initialization file or variable fields may be performed responsive to obtaining the code path directive. This updating process may occur when the application is inactive (e.g., closed or not executing) to update the selected code paths so that the application will use the updated code paths the next time the application is executed.

Figure 5:
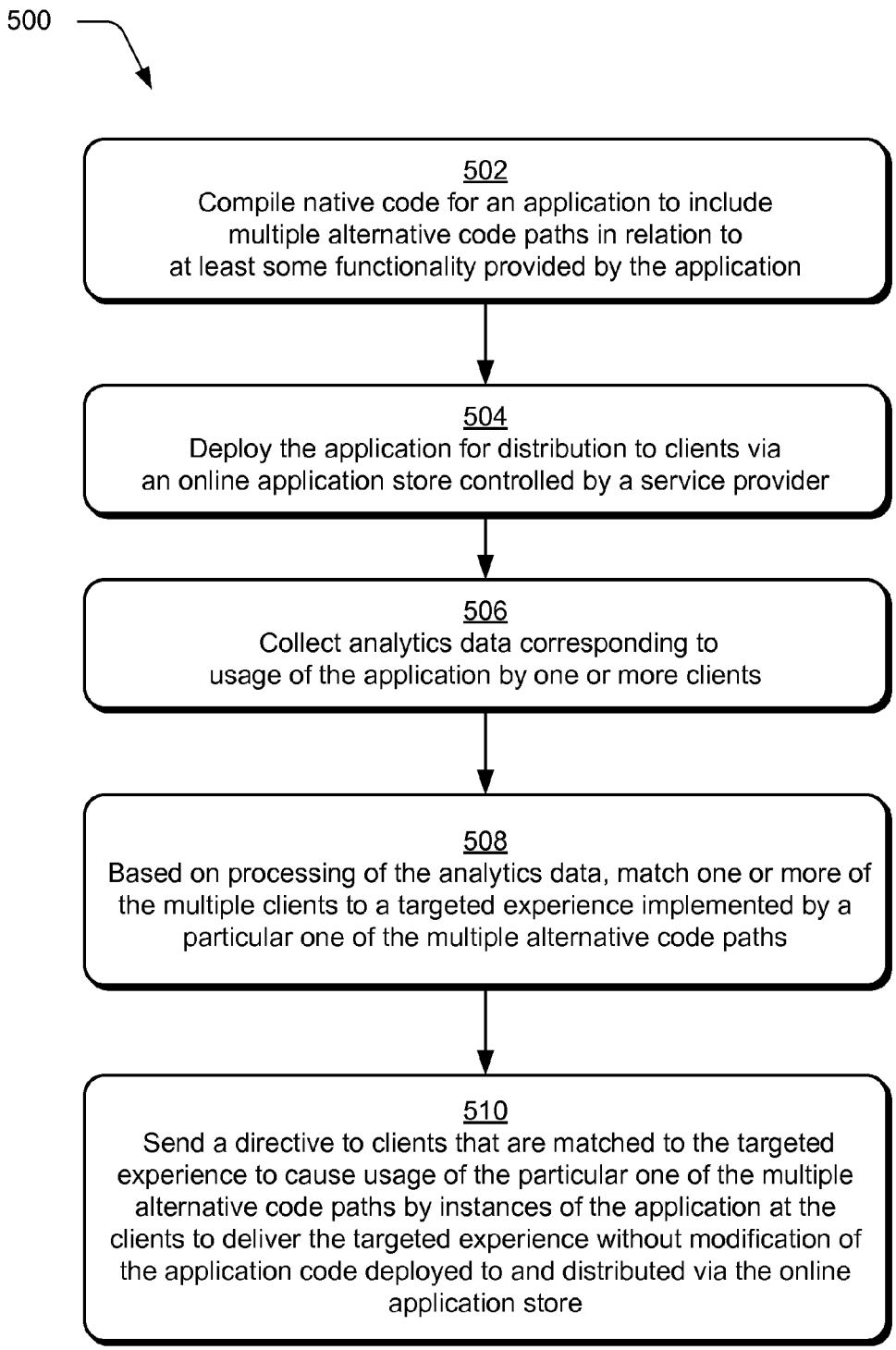
FIG. 5 is a flow diagram depicting an example procedure in which a platform operates to provide targeted experiences to clients based on analytics data collected from the applications in accordance with one or more implementations.

FIG. 5 is a flow diagram depicting an example procedure 500 in which a platform operates to provide targeted experiences to clients based on analytics data collected from the applications. Native code for an application is compiled to include multiple alternative code paths in relation to at least some functionality provided by the application (block 502) and the application is deployed for distribution to clients via an online application store controlled by a service provider (block 504). For example a developer may create an application via a development platform 112 or otherwise. In accordance with techniques described herein, the developer may include one or more collections of alternative execution pathways (e.g., code path groupings) corresponding to different functional aspects of the application in the code for the application. Moreover, the alternate code paths in code paths groupings may be invoked using directives from a web-service as described herein. A representative example of code that may be employed to implement alternate code paths is provided below:

```
if pathname= 'experience 1' then
    showExperienceOne
else
    showDefaultExperience
```

In this example, a value associated with a pathname variable may be used to control whether to use a path associated with a targeted experience (e.g., "ExperienceOne") or to use a default path associated with a default experience (e.g., "DefaultExperience"). Naturally, multiple different code path groupings may be included in an application and different numbers of code path options (e.g., two or more alternatives) may be provided by each individual code path grouping.

The developer may choose to distribute the application via an application store, such as the example application store service 118 associated with a service provider 110 as discussed previously. In order to do so, the developer may initially have to submit the application to an approval process. Once the application clears the approval process, clients may be able to access, download, and install the application through interaction with the application store.

Then, analytics data corresponding to usage of the application by one or more clients is collected (506). For instance, analytics data 122 may be collected over a network by a web-based service from clients in any suitable way. In one approach an analytics module 122 as discussed herein may interact with data collectors 202 that are deployed to various clients to collect analytics data for usage of a corresponding application.

Based on processing of the analytics data, one or more of the multiple clients are matched to a targeted experience implemented by a particular one of the multiple alternative code paths (block 508). The matching may involve matching characteristics indicated by the analytics data to targeted characteristics that are associated with different experiences.

For instance, the analytics data may describe a usage context for a particular application as noted previously that reflects characteristics such as location, user behaviors, application states, device types, user characteristics, business lifecycle data, and so forth. The analytics module 122 may then perform processing to parse the analytics data and recognize various usage characteristics contained therein. Further, the analytics module 122 may match clients/applications to experiences by comparing the usage characteristics to targeted characteristics that are associated with different experiences. The matching may involve matching clients to experiences on an individual basis based on respective analytics data. In addition or alternatively, the analytics module 122 may analyze data collectively for a community of users (e.g., a business, market segment, organization, demographic group, geographic location, or other group of multiple users) and make decisions regarding which experience(s) to provide to the community based on the collective analysis.

Then, a directive is sent to clients that are matched to the targeted experience to cause usage of the particular one of the multiple alternative code paths by instances of the application at the clients to deliver the targeted experience without modification of the application code deployed to and distributed via the online application store (510). In particular, a code path directive may be configured in the manner previously described to communicate code path indications and/or dynamic code to targeted clients. A particular directive may be broadcast to a community of users if appropriate. Directives may also be configured and sent to clients on an individual basis using various protocols and/or messaging techniques.

As noted previously, code path directives may be used by clients to trigger corresponding code paths in various ways. In particular, code path directives may be used to configure applications to selectively use code paths that are indicated by the code path directives, details of which were described above in relation to the example procedure 400 of FIG. 4 and elsewhere herein. In this way, different and updated experiences may be targeted and delivered to different clients or groups of client through alternate code paths that are built-in to compiled code for an application. Further, targeted experiences may be provided without modification of the compiled code for a version of the application that is distributed to clients via an application store or otherwise.

Having described example procedures in accordance with one or more implementations, consider now a discussion of example systems and devices that can be utilized to implement the various techniques described herein.

Example System and Device

Figure 6:
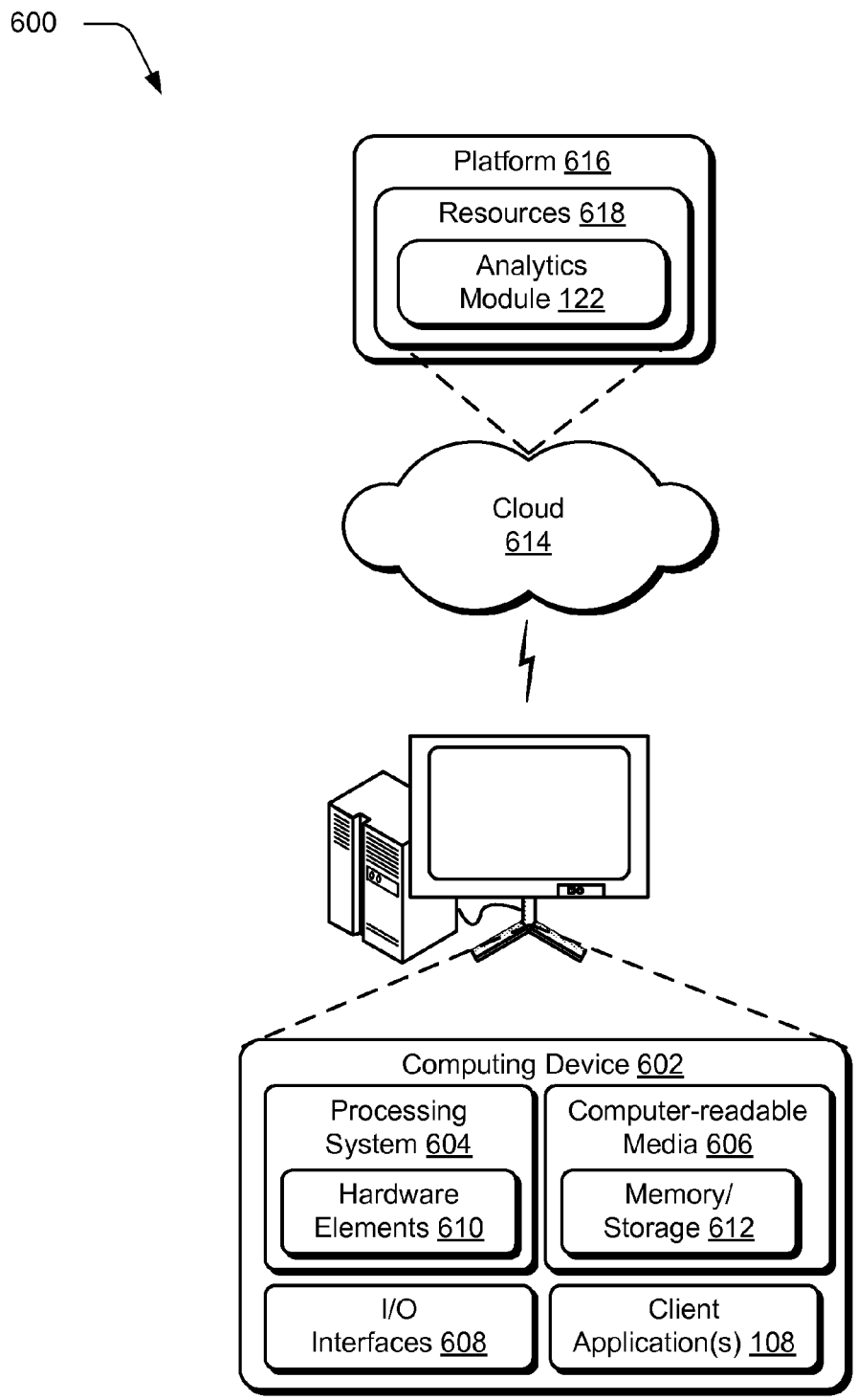
FIG. 6 illustrates an example system including various components of an example device that can be employed for one or more implementations described herein.

FIG. 6 illustrates an example system generally at 600 that includes an example computing device 602 that is representative of one or more computing systems and/or devices that may implement the various techniques described herein. This is illustrated through inclusion of the application module 108, which operates as described above. The computing device 602 may be, for example, a server of a service provider, a device associated with a client (e.g., a client device), an on-chip system, and/or any other suitable computing device or computing system.

The example computing device 602 is illustrated as including a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618 including but not limited to an analytics module 122 as described above. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

Conclusion

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A method implemented by a computing device of a web-based service, the method comprising:
   delivering a client application, which includes multiple alternative code paths implemented as compiled code of the client application and corresponding to different experiences targeted to different usage characteristics, to a client device for use by the client device; and
   after said delivering the client application:
      obtaining, by the computing device, analytics data from the client device via a communications network, the analytics data indicative of usage characteristics of the client device and associated with operation by the client device of the client application;
      selecting one of the multiple alternative code paths, by the computing device, based on the usage characteristics indicated by the obtained analytics data;
      configuring a code path directive, by the computing device, to supply the client application with an indication of the selected one of the multiple alternative code paths, the code path directive configured with at least one dynamic code component for use by the client application in connection with the selected one of the multiple alternative code paths; and
      communicating the code path directive to the client device, by the computing device and via the communication network, the code path directive directing the client application to execute using the selected one of the multiple alternative code paths without modifying the compiled code of the client application.

2. The method of claim 1, wherein the client application comprises a web-application that is operable via a browser of the client device.

3. The method of claim 1, wherein the client application is deployed to an application store service through which client devices may access and download instances of the client application for use by the client devices.

4. The method of claim 3, wherein the client application is subject to an approval process prior to the client application being made available via the application store service and the code path directive enables delivery of the different experiences that are targeted to different client devices without resubmission of the client application to the approval process.

5. The method of claim 1, wherein the multiple alternative code paths correspond to different experiences that are targeted to the different usage characteristics of end-users based on the analytics data.

6. The method of claim 1, wherein the analytics data includes information regarding a usage context associated with operation of the client application by the client device.

7. The method of claim 1, wherein the selecting comprises matching the client device to a targeted experience based on processing of the analytics data and selecting a code path that implements the targeted experience.

8. The method of claim 1, wherein the code path directive is configured as a character string that includes the indication of the selected one of the multiple alternative code paths.

9. The method of claim 1, wherein the at least one dynamic code component includes one or more script-based objects configured to trigger use of a code path of the application that implements the target experience.

10. The method of claim 1, wherein the at least one dynamic code component includes a dynamic link library (DLL) usable by the client application.

11. The method of claim 1, wherein the at least one dynamic code component defines customizations for a user interface of the client application.

12. The method of claim 1, wherein the compiled code of the client application includes one or more code path groupings operable to cause interaction with the web-service to check for code path directives from the web-service designed to control which of the multiple alternative code paths are employed by the client application.

13. The method of claim 1, wherein the indication of the selected one of the multiple alternative code paths causes the client application to deliver a targeted experience without modification of the compiled code of the client application.

14. A method comprising:
compiling native code for an application to include multiple alternative code paths in relation to at least some functionality provided by the application, the multiple alternative code paths implementing different experiences that are targeted to different usage characteristics of clients having the application;
deploying the application for distribution to clients via an online application store controlled by a service provider;
collecting analytics data that indicates the usage characteristics of one or more clients that have the application after the application is distributed to the one or more clients via the online application store;
based on processing of the analytics data, matching one or more of the clients to a targeted experience implemented by a particular one of the multiple alternative code paths and targeted to the usage characteristics indicated by the collected analytics data; and
sending a directive to clients that are matched to the targeted experience, the directive selectively directing instances of the application to use the particular one of the multiple alternative code paths effective to deliver the targeted experience to the clients, the directive configured to include at least one dynamic code component for use by the instances of the application in connection with the particular one of the multiple alternative code paths.

15. The method as described in claim 14, wherein the targeted experience is delivered without modification of the application code deployed to and distributed via the online application store.

16. The method as described in claim 14, wherein the at least one dynamic code component includes one or more script-based objects configured to trigger use of a code path of the application that implements the targeted experience.

17. The method as described in claim 14, wherein the matching of clients to the targeted experience is performed by identifying one or more targeted characteristics indicated by the collected analytics data including one or more of: a location, a user behavior, an application state, a device type, a user characteristic, or a lifecycle parameter.

18. A computing device comprising:
a hardware processing system;
one or more computer readable media storing instructions executable via the hardware processing system to perform operations comprising:
collecting analytics data indicative of a usage context for a client application operated by the computing device that includes multiple alternative code paths implemented as compiled code of the client application and corresponding to different experiences that are targeted to different usage contexts;
supplying the collected analytics data to a web-based service operable to selectively direct the client application regarding usage of the multiple alternative code paths to implement the different experiences;
parsing a code path directive obtained from the web-based service, the code path directive directing the client application to execute using a selected code path of the multiple alternative code paths by specifying the selected code path in the code path directive according to a communication protocol supported by the client application, the selected code path selected by the web-based service based on processing of the analytics data, and the code path directive configured with at least one dynamic code component for use by the client application in connection with the selected code path; and
configuring the client application to use the selected code path in accordance with the code path directive.

19. The computing device as described in claim 18, wherein the code path directive includes a script-based object configured to trigger use of the selected code path by the client application.

20. The computing device as described in claim 18, wherein each of the multiple alternative code paths corresponds to a different targeted experience that the web-based service is operable to deliver to different clients by sending code path directives that cause the different clients to use selected code paths as indicated by code path directives.

\* \* \* \* \*